// United States Patent //
Nakamura et al.

(10) Patent No.: US 12,166,946 B2
(45) Date of Patent: Dec. 10, 2024

(54) IMAGE PROCESSING APPARATUS, IMAGE PROCESSING METHOD, AND MEDIUM

(71) Applicant: CANON KABUSHIKI KAISHA, Tokyo (JP)

(72) Inventors: Takashi Nakamura, Kanagawa (JP); Kouta Murasawa, Kanagawa (JP); Akitoshi Yamada, Kanagawa (JP); Akihiko Nakatani, Kanagawa (JP); Hidetsugu Kagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/465,126

(22) Filed: Sep. 11, 2023

(65) Prior Publication Data

US 2024/0106964 A1 Mar. 28, 2024

(30) Foreign Application Priority Data

Sep. 15, 2022 (JP) ................................ 2022-147209
Jul. 12, 2023 (JP) ................................ 2023-114597

(51) Int. Cl.
*H04N 1/60* (2006.01)
(52) U.S. Cl.
CPC ......... *H04N 1/6025* (2013.01); *H04N 1/6027* (2013.01)
(58) Field of Classification Search
CPC .. H04N 1/6025; H04N 1/6027; H04N 1/6008; H04N 1/6058; H04N 1/60
See application file for complete search history.

(56) References Cited

U.S. PATENT DOCUMENTS

| 6,016,359 A * | 1/2000 | Komatsu ............... G06T 11/001 358/518 |
| 7,116,441 B1 | 10/2006 | Matsuoka .............. G06K 15/00 |
| 7,636,178 B2 | 12/2009 | Nakatani et al. ........ H04N 1/60 |

(Continued)

FOREIGN PATENT DOCUMENTS

| EP | 0961488 A2 * | 1/1999 |
| EP | 0961488 | 12/1999 |

(Continued)

OTHER PUBLICATIONS

U.S. Appl. No. 18/340,724, filed Jun. 23, 2023.
Extended European Search Report dated Jan. 19, 2024 in counterpart EP Application No. 23196000.6.

*Primary Examiner* — Ted W Barnes
(74) *Attorney, Agent, or Firm* — Venable LLP

(57) ABSTRACT

An image processing apparatus obtains image data that is defined as a first color gamut, transforms the image data into image data that is defined as a second color gamut, using color transformation information, and when, as a result of transformation, a first pair of color values included in the image data is transformed into a second pair of color values that have a color difference that is not perceived as different colors, generates second color transformation information such that the first pair of color values is transformed into a third pair of color values that have a color difference that is perceived as different colors as a result of transformation using the second color transformation information. A saturation difference of the third pair of color values is larger than a saturation difference of the second pair of color values.

15 Claims, 10 Drawing Sheets

(56) References Cited

U.S. PATENT DOCUMENTS

| | | | |
|---|---|---|---|
| 7,688,489 B2 | 3/2010 | Nagoshi et al. | G03F 3/08 |
| 7,869,092 B2 | 1/2011 | Nakatani et al. | H04N 1/60 |
| 7,912,280 B2 | 3/2011 | Miyagi et al. | G06K 9/40 |
| 8,031,965 B2 * | 10/2011 | Kishimoto | H04N 1/6058 |
| | | | 382/274 |
| 8,139,849 B2 | 3/2012 | Miyagi et al. | G06K 9/40 |
| 8,243,326 B2 * | 8/2012 | Olson | H04N 1/6011 |
| | | | 358/1.9 |
| 8,310,723 B2 | 11/2012 | Nakatani et al. | H04N 1/60 |
| 8,508,794 B2 | 8/2013 | Nakatani | H04N 1/60 |
| 8,616,668 B2 | 12/2013 | Saito et al. | B41J 2/21 |
| 8,899,715 B2 | 12/2014 | Saito et al. | B41J 2/205 |
| 8,953,234 B2 | 2/2015 | Iguchi et al. | H04N 1/46 |
| 9,055,252 B2 | 6/2015 | Miyake et al. | H04N 1/401 |
| 9,111,204 B2 * | 8/2015 | Fujita | G06K 15/188 |
| 9,162,477 B2 | 10/2015 | Ikeda et al. | B41J 2/205 |
| 9,554,019 B2 | 1/2017 | Kagawa | H04N 1/46 |
| 9,623,671 B2 | 4/2017 | Yamada et al. | B41J 2/21 |
| 9,692,944 B2 | 6/2017 | Goto et al. | H04N 1/60 |
| 9,694,598 B2 | 7/2017 | Ishikawa et al. | B41J 2/21 |
| 10,022,983 B2 | 7/2018 | Yamada et al. | B41J 2/21 |
| 10,748,246 B2 | 8/2020 | Hashii et al. | G06T 1/00 |
| 11,323,576 B2 | 5/2022 | Kagawa et al. | H04N 1/60 |
| 11,368,674 B1 * | 6/2022 | Huang | H04N 9/3194 |
| 11,412,107 B2 | 8/2022 | Tsuchiya et al. | H04N 1/60 |
| 2012/0321177 A1 | 12/2012 | Suzuki et al. | G06K 9/00 |
| 2020/0162639 A1 | 5/2020 | Gonsor et al. | H04N 1/60 |
| 2022/0253655 A1 | 8/2022 | Abe et al. | G06K 15/02 |
| 2022/0358777 A1 | 11/2022 | Mizoguchi et al. | G06V 30/19 |
| 2023/0124689 A1 | 4/2023 | Yamada et al. | H04N 1/60 |
| 2023/0347673 A1 | 11/2023 | Abe et al. | B41M 3/06 |

FOREIGN PATENT DOCUMENTS

| | | |
|---|---|---|
| EP | 1022897 | 7/2000 |
| JP | H07-203234 | 8/1995 |
| JP | 2008-048314 | 2/2008 |
| JP | 2024008264 A * | 1/2024 |
| JP | 2024008265 A * | 1/2024 |

* cited by examiner

IMAGE PROCESSING APPARATUS, IMAGE PROCESSING METHOD, AND MEDIUM

BACKGROUND OF THE INVENTION

Field of the Invention

The present invention relates to an image processing apparatus capable of executing color mapping, an image processing method, and a medium

Description of the Related Art

There are known image processing apparatuses that receive a digital document written in a predetermined color space, perform mapping of the colors in the color space to a color gamut that is reproducible by a printer, and perform outputting. Japanese Patent Laid-Open No. H07-203234 describes determination as to whether or not to perform color space compression on input color image signals and determination of a compression direction. Incidentally, a CIE-L*a*b* space that is a coordinate space in which colors are quantitatively handled is known. The CIE-L*a*b* space is handled as a uniform color space. The uniform color space refers to a color space in which the distance between two points (in other words, two colors) in the color space corresponds to the perceptive color difference between the two colors.

On the other hand, Japanese Patent Laid-Open No. 2008-48314 indicates that the CIE-L*a*b* space is not a perceptive uniform color space in actuality. Specifically, a color space is non-uniform at least in terms of hue on a visual perception plane. This phenomenon is widely known as "MacAdam ellipse". This indicates that even a color whose hue angle is the same irrespective of saturation can be perceived as having a different hue, depending on a color gamut. In actuality, it is known that, when a region of blue (B) to purplish blue (PB) in the Munsell color chart is plotted into the CIE-L*a*b* space, colors in the region are not linearly distributed at the same hue angle.

In Japanese Patent Laid-Open No. H07-203234, unique color space compression is performed on input color image signals in the saturation direction. At this time, the distance between any two points in a large space before color space compression is associated with the distance between two points in a small space after color space compression. Commonly, the distance between any two points after color space compression is shorter than the distance between the corresponding two points before color space compression. Hereinafter, this phenomenon is referred to as "color degeneracy". The larger the difference between the sizes of a space before and after color space compression is, in other words, the higher the compression rate is, the more "color degeneracy" emerges significantly. Note that color space compression is performed in order to keep the colors of an original image within a range of color that is reproducible a using a recording agent, for example, when image data is recorded by a recording apparatus. In other words, color space compression can be performed between a range of color of image data that is to be output and a color reproduction range of an output article.

Next, let us consider a case where color space compression is performed uniquely in a saturation direction. At this time, although the CIE-L*a*b* space is a uniform color space, there are cases where, even when color space compression is performed on the same hue plane, a color does not appear to have the same hue before and after color space compression.

Based on the aforementioned case, a description will be given on an issue that arises when color space compression is performed and color degeneracy occurs. That is to say, the issue is that two colors perceived as different before color space compression may be represented as colors that are too close to be identified from each other, on a hue plane on which, as a result of color space compression, a color can be perceived as different from that before color space compression.

SUMMARY OF THE INVENTION

The present invention suppresses a change in perceptive color due to color space compression or color transformation that involves color space compression. More specifically, a change in perceptive color due to color space compression or color transformation that involves color space compression is suppressed by reducing the degree of color degeneracy caused by color space compression and correcting a change in hue.

The present invention is characterized to have the following configuration. That is to say, according to an aspect of the present invention, an image processing apparatus is provided. The apparatus comprises: at least one memory that stores at least one program; and at least one processor, the at least one program causing the at least one processor to: obtain image data that is defined as a first color gamut, execute transformation processing for transforming the image data into image data that is defined as a second color gamut that is difference from the first color gamut, using color transformation information, and when, as a result of transformation processing that uses first color transformation information, a first pair of color values included in the image data is transformed into a second pair of color values that have a color difference that is not perceived as different colors, generate second color transformation information such that the first pair of color values is transformed into a third pair of color values that have a color difference that is perceived as different colors as a result of performing transformation processing that uses the second color transformation information, wherein a saturation difference of the third pair of color values is larger than a saturation difference of the second pair of color values.

According to the present invention, it is possible to suppress a change in perceptive color caused by color space compression or color transformation that involves color space compression.

Further features of the present invention will become apparent from the following description of exemplary embodiments with reference to the attached drawings.

DESCRIPTION OF THE EMBODIMENTS

Figure 1:
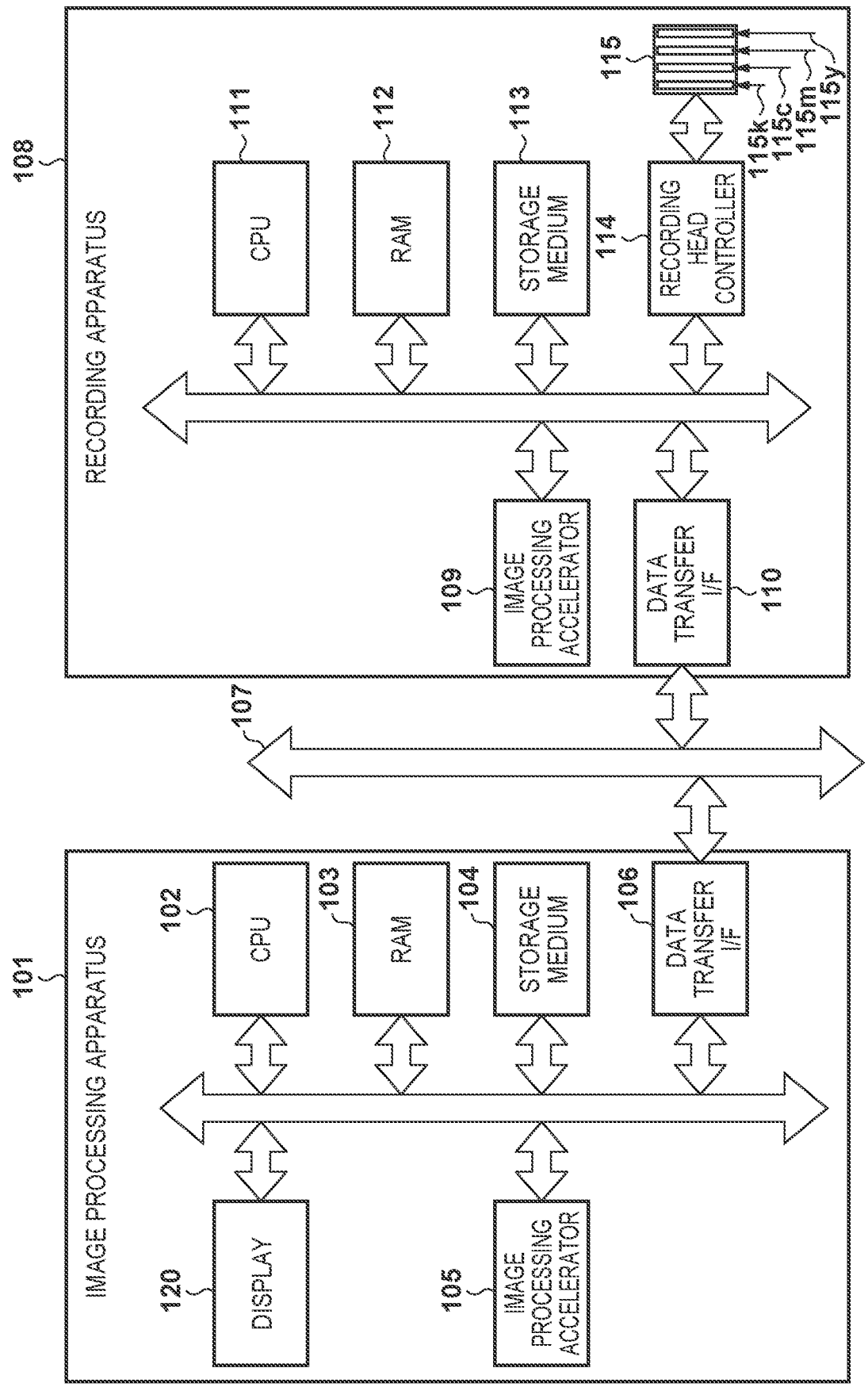
FIG. 1 is a block diagram showing configurations of an image processing apparatus and a recording apparatus.

Hereinafter, embodiments will be described in detail with reference to the attached drawings. Note that the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

In the present embodiment, if the direction of color movement due to adaptive gamut mapping is the same as the saturation direction, a color changes in a L*a*b* color space in which normal gamut mapping is performed, and thus gamut mapping is performed in a JCh color space instead of the L*a*b* color space. Terms as used herein are defined in advance as follows.

Color Reproduction Area

A color reproduction area refers to a range of color that is reproducible in a given color space. The color reproduction area is also called color reproduction range, color gamut, or gamut. Reproduction of colors refers to representation of colors indicated by numerical values in image data, as perceivable colors by performing displaying and printing, for example.

In addition, a gamut volume is an index indicating the size of this color reproduction area. A gamut volume is a volume in a given color space. When a color space is three-dimensional, a gamut volume is a three dimensional volume. Chromaticity points that make up a color reproduction area may be discrete. There are cases where, for example, a specific color reproduction area is represented by 729 points in CIE-L*a*b*, and points therebetween are obtained using known interpolation computation such as tetrahedral interpolation or cube interpolation. In such a case, the volume of a tetrahedron, a cube, or the like in CIE-L*a*b* that makes up the color reproduction area is obtained, depending on an interpolation computation method, such volumes are accumulated, and the resultant can be used as a corresponding gamut volume. Alternatively, the volume of a minimum polyhedron that includes all of the representative points may be used.

A color reproduction area and also a color gamut in the present specification are not limited to a specific color space, but in the present specification, a color reproduction area in the CIE-L*a*b* space is described as an example. In addition, similarly, numerical values in a color reproduction area in the present specification indicate a volume when accumulative calculation is performed in the CIE-L*a*b* space based on the assumption of tetrahedral interpolation.

Gamut Mapping

In the present specification, gamut mapping is also referred to as mapping, mapping processing, or color information transformation. Gamut mapping is associating any groups related to colors (or representing colors) with one another. Assume that, for example, a color reproduction space of a digital image is sRGB. Assume that signal values that make up this image are associated with the CIE-L*a*b* color space. In this case, the associating process is referred to as "mapping data from the sRGB color space into the CIE-L*a*b* color space". A lookup table is a means for realizing this process. The lookup table refer to a table in which image mapping destinations of input values (that is to say, values associated with input values) are defined using the input values as indexes. If the input color space is a three-dimensional color space, in general, values corresponding to the number of values that each color component can take (for example, 256 values) or the cube of a number that is smaller than that are prepared as input values, for example.

The lookup table defines image mapping destinations for respective input values. Such input values are referred to as "grid points". Image mapping destinations for input of data other than grid points are determined by aforementioned interpolation computation. Such a lookup table is also referred to as a "profile". Specifically, "Perceptual", "Saturation", and "Colorimetric" of an ICC profile are commonly used. A mapping means is not limited to a lookup table. A transformation formula of some type may also be used, or computation may also be performed using a matrix, for example. Furthermore, a color space that is associated is not limited. A CIE-XYZ color space that is a three-dimensional color space and a CMYK color space of a printer that is a four-dimensional color space may be associated with each other, for example. A configuration may also be adopted in which an input color space is the CMYK color space, and an output color space is the sRGB color space. In the present embodiment, a lookup table for gamut mapping is referred to as a "gamut mapping table" or a "color transformation information". In the present specification, "image mapping" and "transformation" are used interchangeably.

Document Data

Document data refers to entire input digital data that is to be processed. Document data is made up of one or more pages. Each page may be held as image data, or may be represented as a rendering command. When each page is represented as a rendering command, processing may be performed after rendering is performed so as to transform the document data into image data. A rendering command includes color information for designating a color of an object as a parameter. Image data has a configuration in which a plurality of pixels are two-dimensionally arranged. Each pixel holds information representing a color within a color space. Information representing a color may be an RGB value, a CMYK value, a K value, a CIE-L*a*b* value, an HSV value, an HLS value, or the like, in accordance with a type of a color space that is adopted.

Color Correction

Color correction is processing for correcting color information of document data, that is to say, colors that are perceived when the document data is output, based on the original colors of the document data. Outputting is mainly displaying or printing, but in the present embodiment, outputting is recording data onto a medium by a recording apparatus. A color space, in other words, a color coordinate system does not change before and after color correction. When color correction is performed using a lookup table, this table is referred to as a "color correction table".

Color Separation

Among types of color information transformation for transforming colors represented in a specific color space into another color space, a type of color information transformation in which a color space after transformation is a color space of output colors of an output device is called "color separation". In the present embodiment, color separation for transforming a color space of input data of a recording apparatus into a color space in which the densities of ink colors serve as components is performed. When color separation is performed using a lookup table, the table is referred to as a "color separation table".

Configuration of Image Processing Apparatus

FIG. 1 is a block diagram showing a configuration of an image processing apparatus according to the present embodiment. A personal computer (PC), a tablet, a server, or a recording apparatus may be used as an image processing apparatus 101. A central processing unit (CPU) 102 loads a program stored in a storage medium 104 such as a hard disk drive (HDD) or a read-only memory (ROM), to a random access memory (RAM) 103 serving as a work area, and executes the program. Note that the CPU may be referred to as a "processor". The CPU 102 obtains a command from the user via a human interface device (HID) or an interface (I/F) (not illustrated), for example. The CPU 102 then executes various types of image processing in accordance with an obtained command or a program stored in the storage medium 104.

In addition, the CPU 102 performs predetermined processing on document data obtained via a data transfer OF 106, in accordance with a program stored in the storage medium 104. The CPU 102 then displays the result and various types of information on a display 120, and transmits the result and information to an external apparatus such as a recording apparatus 108 via the data transfer OF 106. An image processing accelerator 105 is hardware capable of executing image processing at a higher speed than the CPU 102. The image processing accelerator 105 is started by the CPU 102 writing parameters and data required for image processing, to a predetermined address of the RAM 103. The image processing accelerator 105 reads the above parameters and data, and then executes image processing on the data. It should be noted that the image processing accelerator 105 is not an essential element, and similar processing may be executed by the CPU 102. The image processing accelerator is specifically an image processing unit (GPU) or a dedicatedly designed electronic circuit. The above parameters may be stored in the storage medium 104, or may be obtained from the outside via the data transfer OF 106.

Configuration of Recording Apparatus

A CPU 111 of the recording apparatus 108 integrally controls the recording apparatus 108 by loading a program stored in a storage unit 113 to a RAM 112 serving as a work area, and executing the program. An image processing accelerator 109 is hardware capable of executing image processing at a higher speed than the CPU 111. The image processing accelerator 109 is started by the CPU 111 writing parameters and data that are required for image processing, to a predetermined address of the RAM 112. The image processing accelerator 109 reads the above parameters and data, and then executes image processing on the data. It should be noted that the image processing accelerator 109 is not an essential element, and similar processing may be executed by the CPU 111. The above parameters may be stored in the storage unit 113, or may be stored in a storage such as a flash memory or an HDD (not illustrated).

Here, image processing that is performed by the CPU 111 or the image processing accelerator 109 will be described. Image processing is processing for generating data indicating dot forming positions of ink each time scanning is performed using a recording head 115, based on record data obtained from the image processing apparatus 101 or the like, for example. Alternatively, it can also be said that image processing is processing for generating data indicating whether or not to form a dot at each recording position each time scanning is performed. Image processing that is performed by the CPU 111 or the image processing accelerator 109 includes color transformation processing and quantization processing of obtained record data.

Color transformation processing is processing for transforming record data into ink data that is handled by the recording apparatus 108. Obtained record data includes image data indicating an image, for example. If the image data is data indicating an image as color space coordinates of sRGB or the like, namely colors that are represented by a monitor, the data indicating an image as color coordinates (R, G, B) of sRGB is transformed into ink data (CMYK) that is handled by the recording apparatus 108. A color transformation method is realized by matrix computation processing, processing that uses a three-dimensional lookup table (LUT) or a four-dimensional LUT, or the like. When color transformation is performed using a lookup table, the lookup table is also referred to as a "color separation table".

The recording apparatus 108 according to the present embodiment uses black (K) ink, cyan (C) ink, magenta (M) ink, and yellow (Y) ink, as an example. Therefore, image data of RGB signals is transformed into image data made up of K, C, M, and Y color signals (also referred to as color components). Each color signal is represented in 8 bits, for example. A color signal of each color corresponds to a amount of ink of the color to be applied. In addition, an example has been described in which the number of colors of ink is four, namely C, M, Y, and K, but, in order to improve the image quality, ink of other colors such as light cyan (Lc) ink, light magenta (Lm) ink, and gray (Gy) ink whose densities are low may also be used. In that case, color signals corresponding to them are generated.

After color transformation processing, quantization processing is performed on ink data. Quantization processing is processing for reducing the number of gradation levels of ink data. In the present embodiment, quantization is performed using a dither matrix in which thresholds for comparing pixels with values of ink data are arranged. In a simple dithering method, each pixel value is transformed into one of two values in accordance with the magnitude relationship obtained by comparison with a corresponding threshold. After quantization processing, ultimately, binary data indicating whether or not to form dots at dot formation positions is generated. In addition to the simple dithering method, another method such as an error diffusion method may also be used for quantization.

After image processing is performed, the binary data is transferred to the recording head 115 by a recording head controller 114. At the same time, the CPU 111 operates, via the recording head controller 114, a carriage motor for operating the recording head 115, and further performs recording control to operate a conveyance motor for conveying a recording medium. The recording head 115 scans the recording medium, and, at the same time, ink droplets are discharged onto the recording medium by the recording head 115, whereby an image is formed.

The image processing apparatus 101 and the recording apparatus 108 are connected via a communication line 107. In the present embodiment, a local area network is used as an example of the communication line 107, but a USB hub, a wireless communication network that uses a wireless access point, connection that uses a Wifi direct communication function, and the like may also be used.

A description will be given below assuming that the recording head 115 includes recording nozzle rows for four ink colors, namely, cyan (C), magenta (M), yellow (Y), and black (K).

Recording Head

Figure 2:
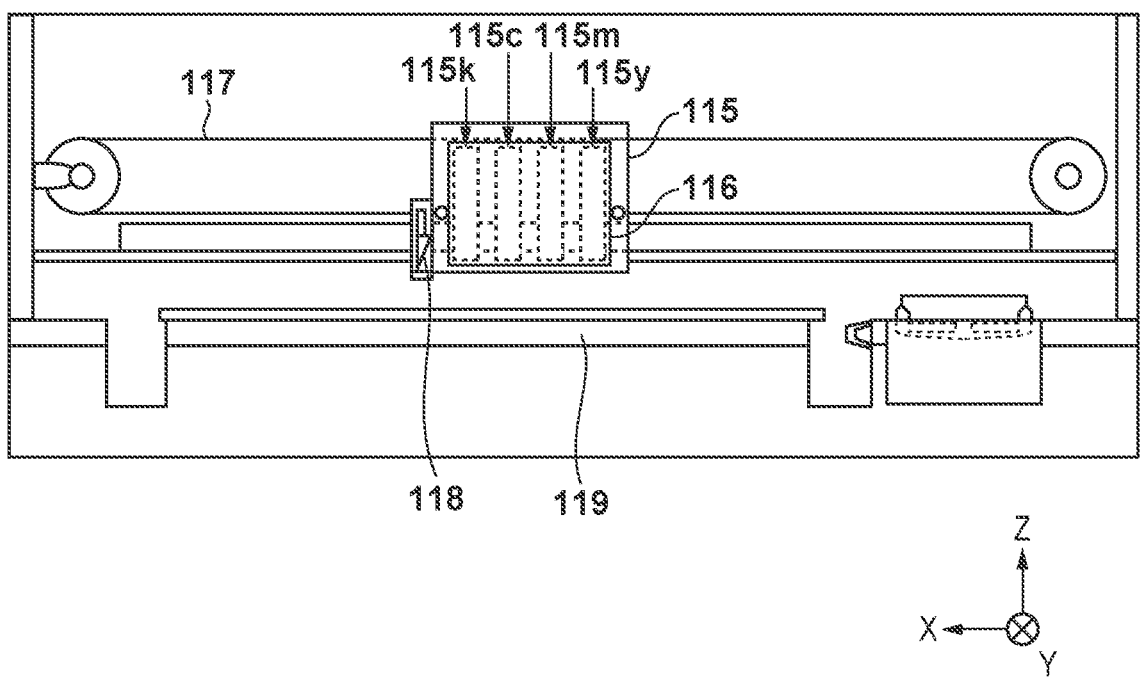
FIG. 2 is a diagram schematically showing the configuration of the recording apparatus.

FIG. 2 is a diagram for describing the recording head 115 according to the present embodiment. In the present embodiment, scanning is performed once in a unit region for each nozzle row so as to form an image, and such scanning is performed a plurality of times (for example, N times), thereby forming an image for 1 page. The recording head 115 includes the carriage 116, nozzle rows 115k, 115c, 115m, and 115y, and an optical sensor 118. The carriage 116 in which the five nozzle rows 115k, 115c, 115m, and 115y and the optical sensor 118 are mounted is reciprocally movable along the X direction in FIG. 2 (main scanning direction) due to a drive force of a carriage motor that is transmitted via a belt 117. The carriage 116 moves relatively to the recording medium in the X direction, and ink droplets are discharged from the nozzles of the nozzle rows in the gravity direction (−z direction in FIG. 2) based on record data. Accordingly, an image formed as a result of the main scanning being performed 1/N times is recorded onto the recording medium placed on a platen 119. When the main scanning is complete once, the recording medium is conveyed by a distance corresponding to the width of main scanning performed 1/N times, along a conveyance direction that intersects the main scanning direction (−y direction in FIG. 2). Due to these operations, an image having a width of one nozzle row is recorded by scanning being performed a plurality of times, namely N times. As a result of alternately repeating such main scanning and a conveyance operation, an image is gradually formed on the recording medium. By performing the above processing, control can be performed so as to complete image recording in a predetermined region.

Overall Flow

Figure 3:
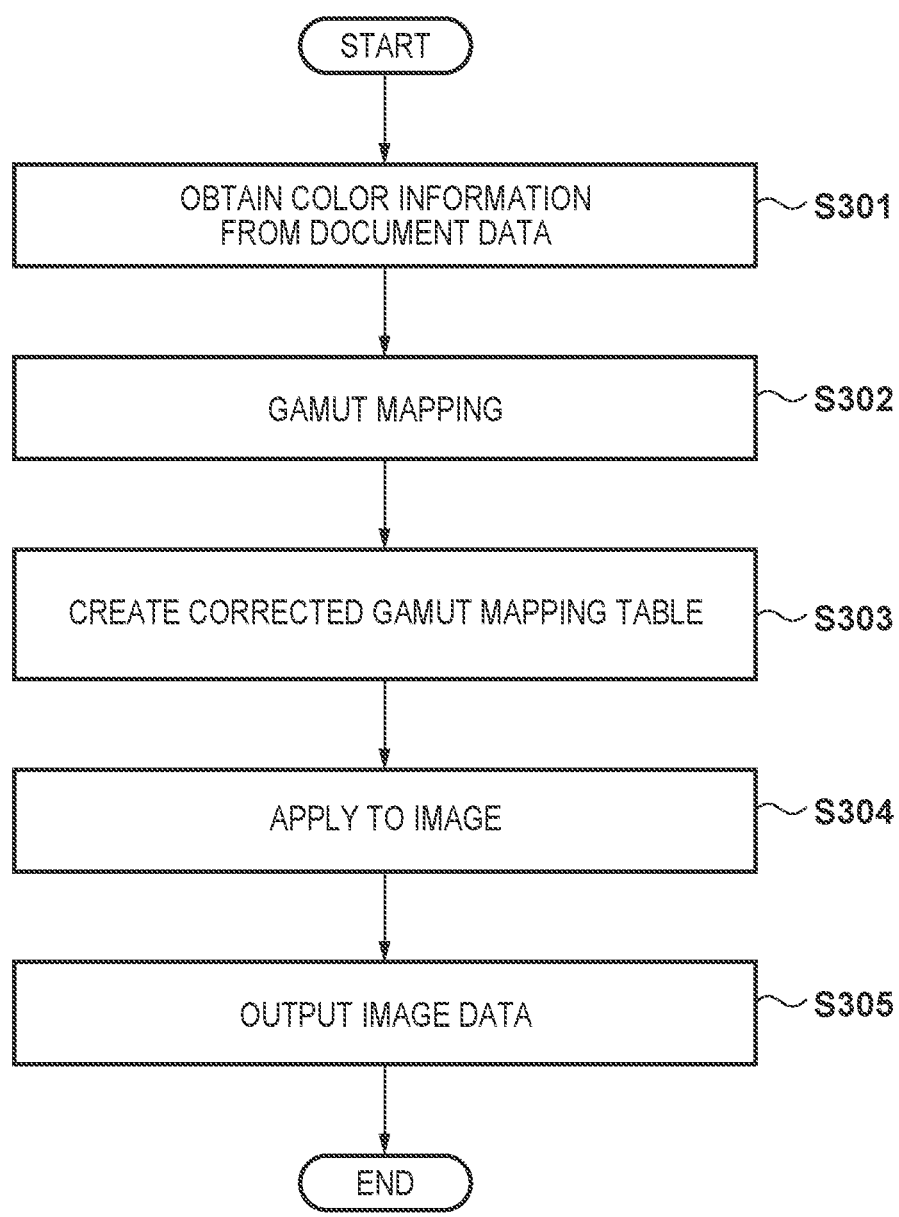
FIG. 3 is a flowchart showing overall processing that is performed by an image processing apparatus according to a first embodiment.

FIG. 3 is a flowchart showing overall flow of image processing that is performed by the image processing apparatus 101 according to the present embodiment. In the present embodiment, with respect to combination of colors that degenerate, it is possible to increase the distance between colors in a predetermined color space by performing the processing in FIG. 3. As a result, it is possible to reduce the degree of color degeneracy. The processing in FIG. 3 is realized by the CPU 102 loading a program stored in the storage medium 104, to the RAM 103, and executing the program, for example. In addition, the processing in FIG. 3 may also be executed by the image processing accelerator 105.

In step S301, the CPU 102 obtains document data stored in the storage medium 104. In addition, document data obtained via the data transfer OF 106 may be input (to the CPU 102). Color information obtaining processing for obtaining color information from input document data is performed. Whether document data is image data or a rendering command, the document data includes values indicating colors represented in a predetermined color space. In the color information obtaining processing, values indicating colors are obtained. Examples of the values indicating colors include sRGB data, Adobe RGB data, CIE-L*a*b* data, CIE-LUV data, XYZ color coordinate system data, xyY color coordinate system data, HSV data, and HLS data.

In step S302, the CPU 102 performs color information transformation, in other words, gamut mapping on image data, using color transformation information stored in the storage medium 104 in advance. Color transformation information in the present embodiment is a lookup table for gamut mapping. Here, the color transformation information that is used in step S302 will be described. Description has already been given that the CIE-L*a*b* space is not necessarily a perceptive uniform color space in terms of hue. In the present embodiment, a JCh color space that is a CIE color appearance model (CIECAM) space is used. The JCh color space will be described. The JCh color space is a color space model defined in the color appearance model published in 2002 (hereinafter, referred to as "CAM02") recommended in 2002 by International Commission on Illumination (hereinafter, referred to as "CIE") Technical Committee 8-01, in other words, Technical Committee for the color appearance model. Definition formulas conform to the standard stipulated by International Commission on Illumination (CIE) Technical Committee 8-01 in 2002.

Figure 11:
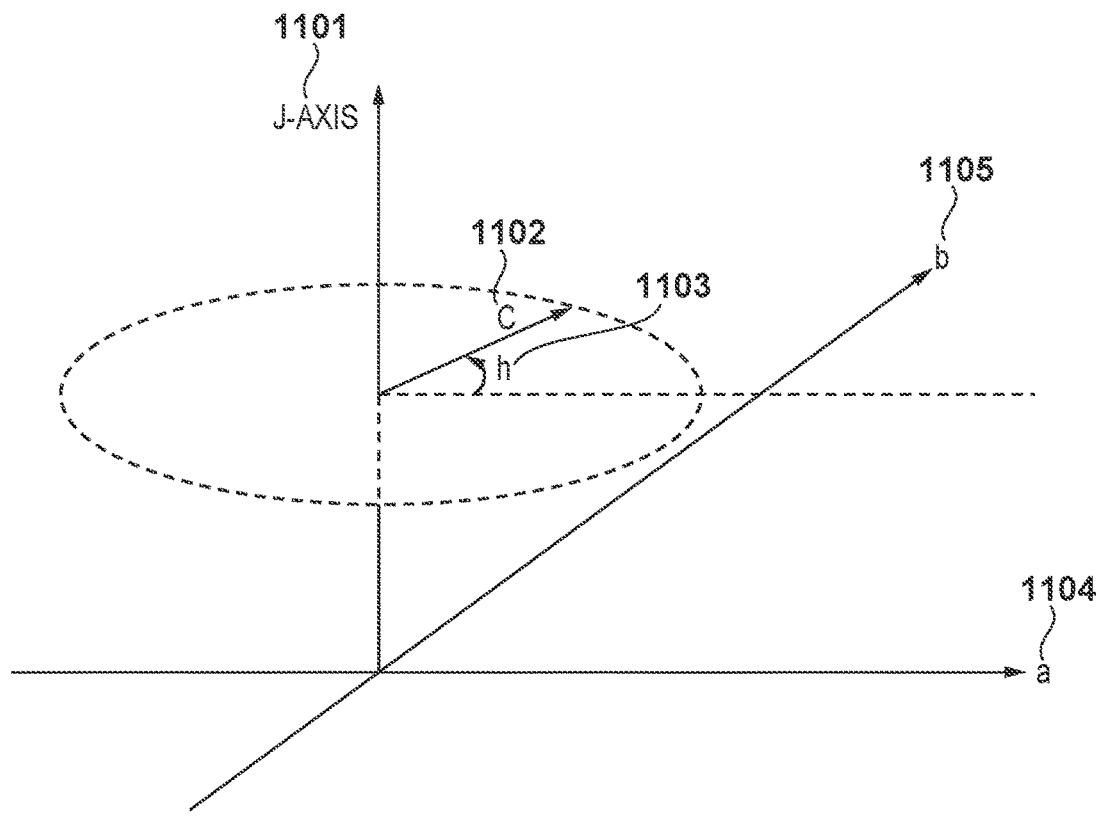
FIG. 11 is a schematic diagram of the JCh color space.

FIG. 11 is a schematic diagram of the JCh color space. The J axis 1101 is an axis that indicates brightness at an achromatic color position in the color space. Saturation 1102 is a distance from the J axis that is an achromatic color axis. This depends on the distance from the axis, not on brightness J. In the figure, C represents saturation. Hue 1103 is an azimuth angle from a reference axis. An axis a and an axis b serving as references for calculating the hue 1103 are the axis a and the axis b that re defined in the above CAM02. In gamut mapping in step S302, colors included in document data are transformed from the RGB color space into the JCh color space.

When colors of document data are represented in the RGB three-dimensional color space, the gamut mapping table is a three-dimensional lookup table. Hereinafter, a suffix "in" is attached in order to distinguish input sRGB. In addition, a suffix "out" is attached to distinguish output JCh. By using such a three-dimensional lookup table, a combination of output pixel values (Jout, Cout, hout) can be calculated for a combination of input pixel values (Rin, Gin, Bin). When the input values Rin, Gin, and Bin each take 256 gradations, it is preferable to use Table 1 [256] [256] [256] [3] that includes 256×256×256=total 16,777,216 pairs of output values. In step S302, color information transformation is performed using a gamut mapping table prepared in advance, namely Table 1. Specifically, such color information transformation can be realized by performing the following processing on the pixels of an image made up of the RGB pixel values of the image data input in step S301.

$$\text{Jout} = \text{Table 1}[Rin][Gin][Bin][0] \quad \text{(Expression 1)}$$

$$\text{Cout} = \text{Table 1}[Rin][Gin][Bin][1] \quad \text{(Expression 2)}$$

$$\text{hout} = \text{Table 1}[Rin][Gin][Bin][2] \quad \text{(Expression 3)}$$

In addition, a known ingenuity for reducing the table size may be used, such as reducing the number of grids of the lookup table from 256 grids to 16 grids, for example, interpolating table values of a plurality of grids, and determining output values. Image data represented in the JCh color space after gamut mapping is recorded in the RAM 103 or the storage medium 104. In this manner, in step S302, it is possible to associate RGB values of colors included in the document data with JCh values corresponding to respective colors.

Next, in step S303, the CPU 102 creates a corrected gamut mapping table in which color degeneracy has been corrected using the image data input in step S301, the image data subjected to gamut mapping performed in step S302, and the gamut mapping table. The format of the corrected gamut mapping table is similar to the format of the gamut mapping table used in step S302. In other words, in this example, the corrected gamut mapping table is a table for mapping the colors used in the document data from the RGB color space into the JCh color space. A method for generating the corrected gamut mapping table will be described later.

In step S304, the CPU 102 performs color correction on the document data received in step S301, using the color correction table in which color degeneracy has been corrected and that was created in step S303. Corrected image data, namely image data subjected to color degeneracy correction is generated in this manner. The generated corrected image data is stored in the RAM 103 or the storage medium 104.

In step S305, the CPU 102 outputs the corrected image data recorded in step S304, from the image processing apparatus via the data transfer OF 106.

Note that gamut mapping that is performed in step S304 is color correction in the sRGB color space, but may also be mapping from the sRGB color space into a color representation gamut of a recording apparatus. If input to the recording apparatus is L*a*b* data, mapping from sRGB into L*a*b* may be performed, for example. In addition, gamut mapping in step S304 may be mapping into an ink color space of KCMY or the like. In this case, in either way, it is possible to suppress a decrease in saturation and a color difference due to gamut mapping into the color representation gamut of the recording apparatus.

Method for Generating Color Transformation Information

Figure 4:
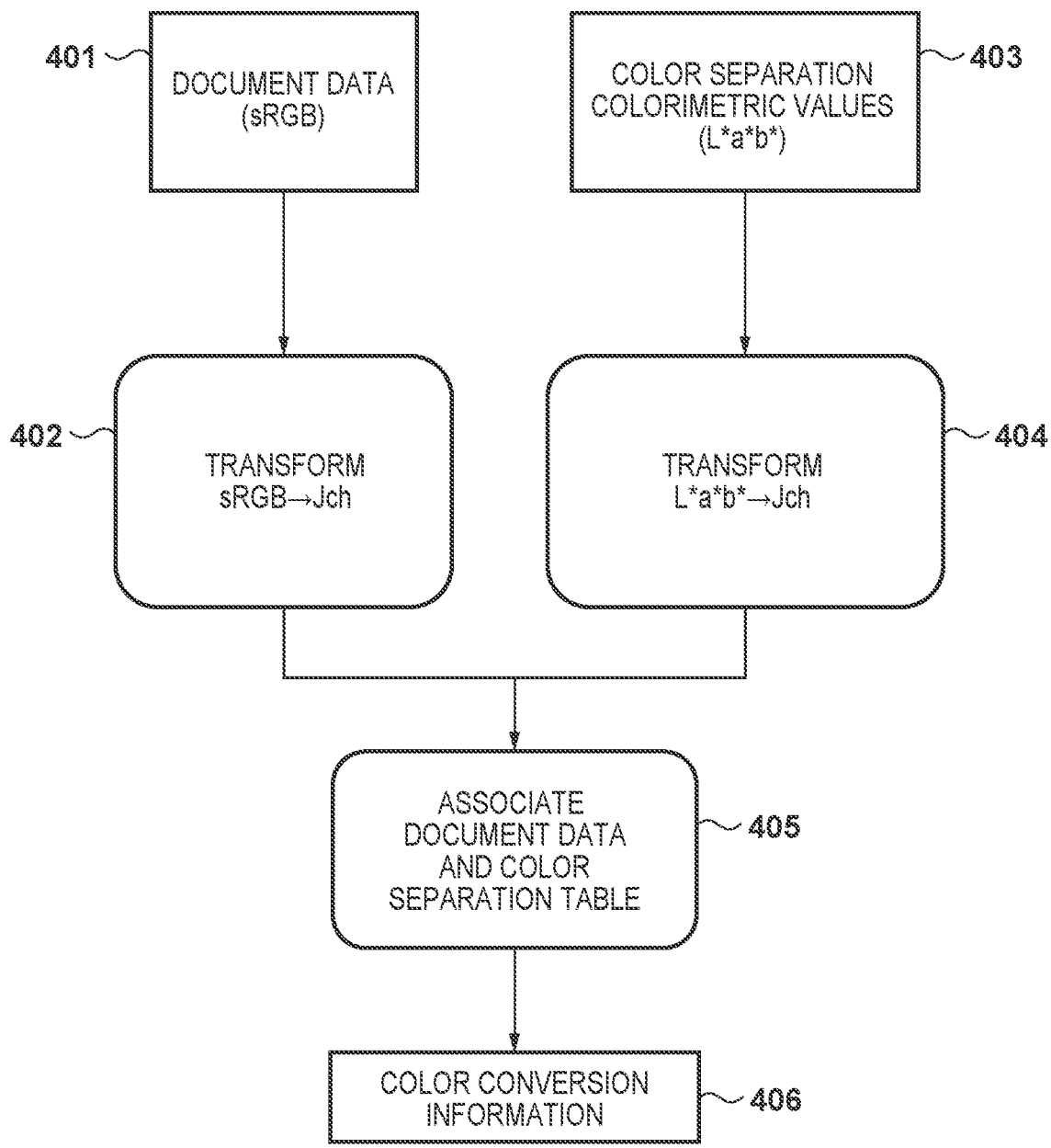
FIG. 4 is a flow diagram showing creation of a color difference correction table according to the first embodiment.

A method for generating color transformation information that is used in the present embodiment will be described with reference to FIG. 4. FIG. 4 is a conceptual diagram illustrating processing for generating the corrected gamut mapping table in step S303.

Input 401 is information of grid points in a color space that represents colors of document data. This corresponds to input in step S301 in FIG. 3. In the present embodiment, document data written in sRGB is illustrated. In processing 402, the input 401 is transformed into the JCh color space. This corresponds to the process of step S302 in FIG. 3. At this time, color information included in the input 401 and JCh color information after transformation are associated with each other, and recorded in the RAM 103 or the storage medium 104.

On the other hand, input 403 is color separation colorimetric values. Color separation is processing for separating color signals such as color signals of document data into color signals of ink used by the recording apparatus, as described in the definition. In the present embodiment, color separation is performed using a color separation table for transformation from RGB into KYMC, for example. That is to say, color separation processing is performed using a table in which combinations of color signals of ink are defined for the grid points in the input color space. As a result of color separation, signals that make up the document data can be replaced with ink signals. If the document data is changed into grid point data that covers the entire input area, a printed article can represent the entire color reproduction area of the printer. The color separation table may be determined in advance and held by the image processing apparatus 101. Color separation colorimetric values 403 are values obtained by transforming input image data of RGB into KYMC using the color separation table, printing the resulting data, and performing colorimetry in the L*a*b* color space. If, for example, patches for respective grid points of input RGB are printed and a table of the patches subjected to colorimetry is prepared in advance, a portion thereof that corresponds to RGB values included in the document data can be extracted and used as the color separation colorimetric value 403. That is to say, a color separation colorimetric value may be provided from a table in which input RGB values are associated with L*a*b* values subjected to colorimetry, for example.

Processing 404 is processing for transforming the color separation colorimetric values, namely the input 403 into JCh values. Accordingly, for example, a table in which input RGB values are associated with JCh values subjected to colorimetry is obtained.

In processing 405, the input grid point data obtained in the processing 402 and the color separation colorimetric values obtained in the processing 404 are associated with each other using RGB as a medium, and color transformation information 406 is obtained. That is to say, in this example, JCh color transformation information in which JCh values of input document data are associated with JCh values obtained by performing printing and colorimetry is obtained. A color degeneracy correction table is generated using this JCh color transformation information as will be described later with reference to FIG. 6.

Associating data in the processing 405 may be performed by any associating method such as a least color difference method and a one-point convergence method. Associating data in a color space indicated by CIECAM02 such as JCh makes the influence on hue minor. When a color degeneracy correction table is generated, the table is reflected on the gamut mapping table used in step S302, and a corrected gamut mapping table is obtained.

Creation of Color Degeneracy Correction Table

Figure 5:
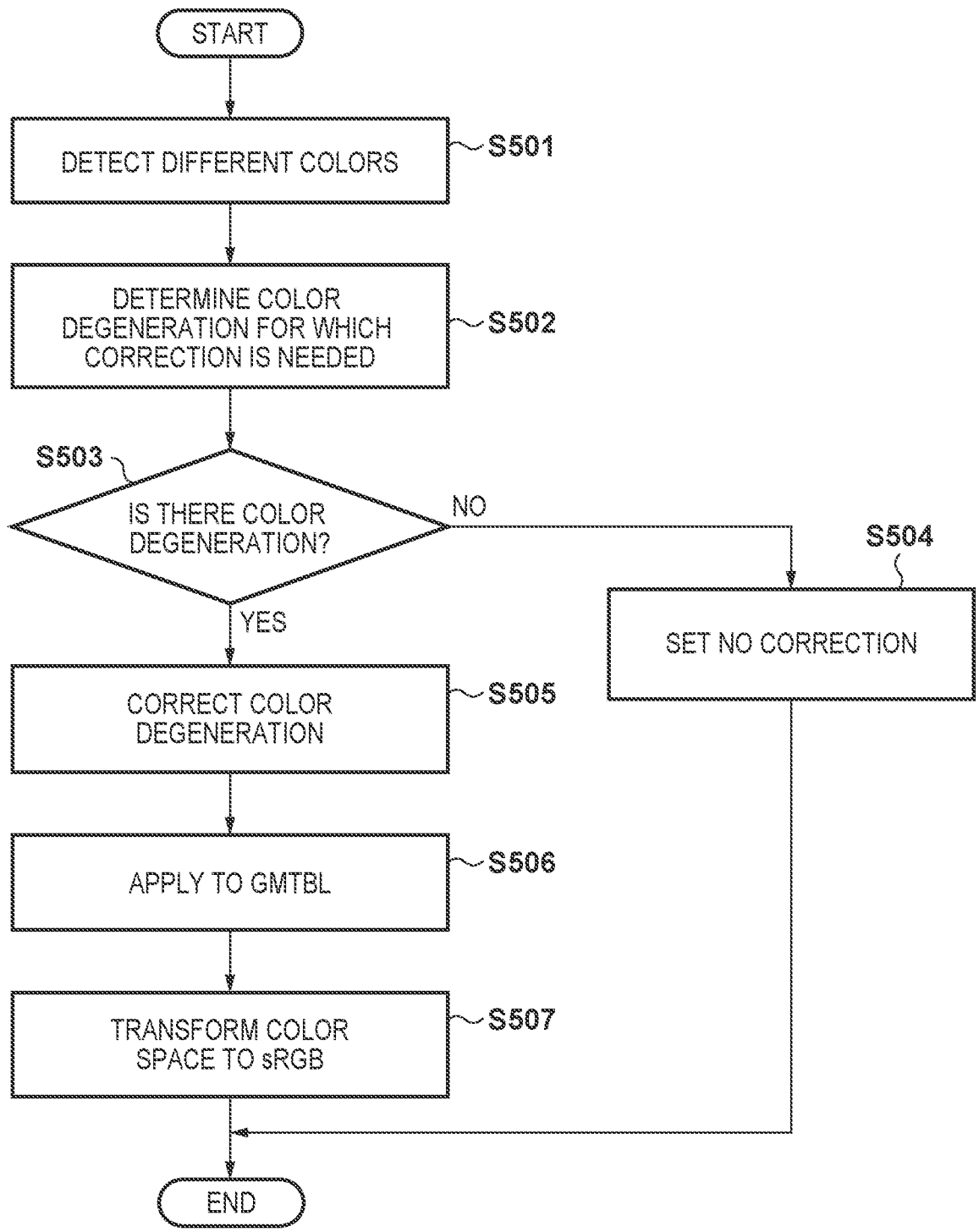
FIG. 5 is a flowchart showing creation of a color difference correction table according to the first embodiment.

FIG. 5 is a diagram for describing processing for creating the color degeneracy correction table in step S303. The processing in FIG. 5 is realized, for example, by the CPU 102 loading a program stored in the storage medium 104, to the RAM 103, and executing the program. In addition, the processing in FIG. 5 may also be executed by the image processing accelerator 105. The processing in FIG. 5 is performed on entire document data, for example, but may be performed in units of divided ranges such as pages.

In step S501, the CPU 102 detects colors included in the document data input in step S301 (referred to as "unique colors"). The detection result is stored to the RAM 103 or the storage medium 104 as a unique color list. The unique color list is initialized when step S501 is started. The detection processing is repeated for each color included in the document data, and determination is performed as to whether or not each of all of the colors included in the image data is different from unique colors detected to this point. If a color is determined as a unique color, the color is stored in the unique color list as a unique color.

If the document data is image data, in step S501, first, a specific pixel included in the image data is set as a target pixel, and determination is performed as to whether or not the color value of the target pixel has been already added to the unique color list, by comparing it with the colors in the list. If the color value of the target pixel is not included yet, color information thereof is newly added to the unique color list. The target pixel then is moved in raster order, for example. A list of unique colors that are included in the image data can be generated in this manner.

In the above description, if input image data is sRGB data, each color has 256 gradations, and thus a unique color is detected from 256×256×256=total 16,777,216 colors. In this case, the number of colors is huge, and the processing speed decreases. For this reason, unique colors may be discretely detected. A configuration may be adopted in which color reduction is performed from 256 gradations to 16 gradations, and unique colors are then detected, for example. A color reduction may performed based on the color of the closest grid. As described above, it is possible to detect unique colors from 16×16×16=total 4096 colors, and the processing speed improves.

Note that the above procedure may be performed in step S301 in FIG. 3, and, for this reason, step S501 can be omitted by using the color information obtained in step S301. In addition, JCh color transformation information has been creased for RGB values included in the document data, and thus there is no need to obtain colors used in the document data.

Figure 6:
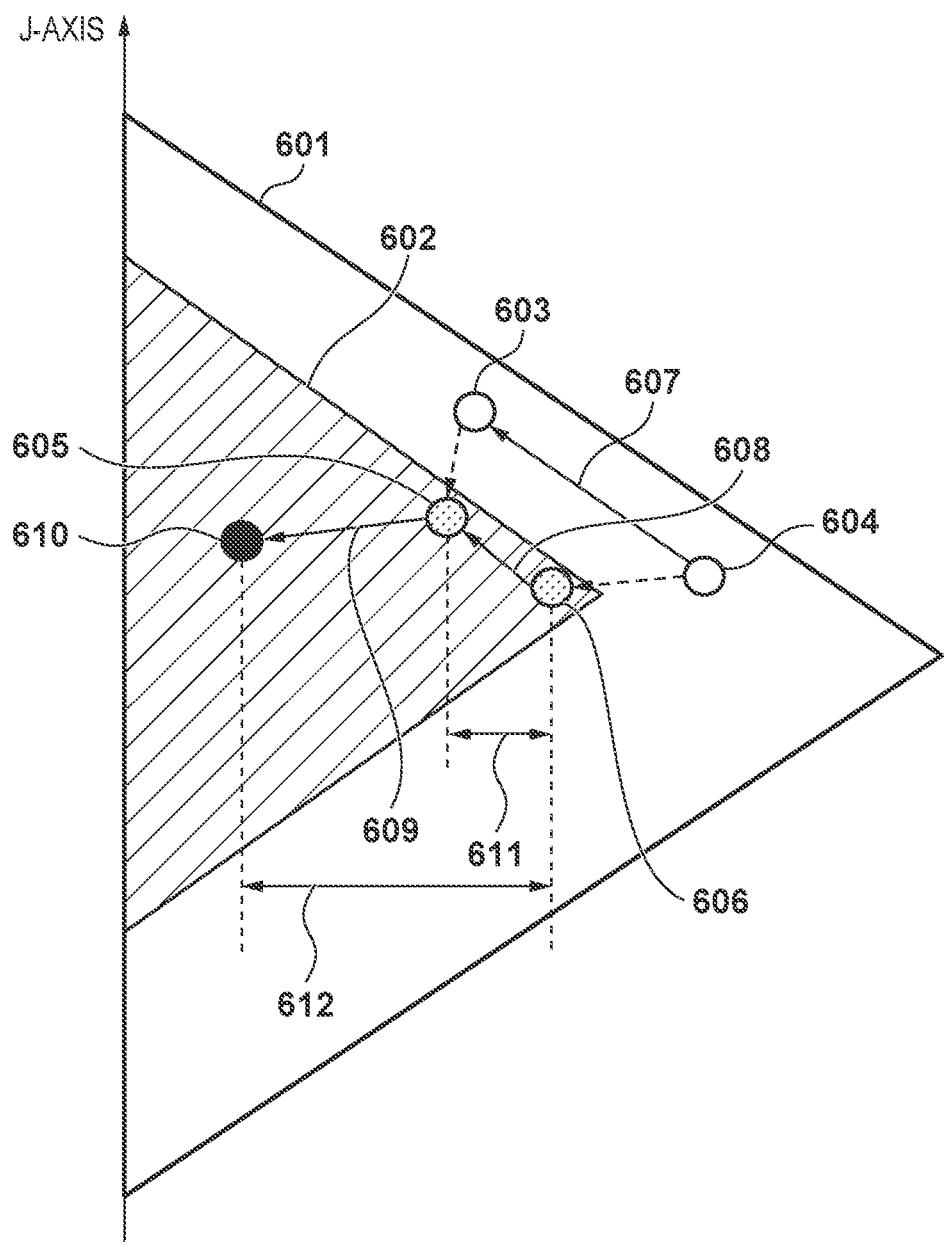
FIG. 6 is a diagram schematically showing color difference correction processing according to the first embodiment.

Next, in step S502, the CPU 102 specifies colors that have degenerated due to gamut mapping and that require color degeneracy correction, by referencing the JCh color transformation information created in the processing 405 in FIG. 4. FIG. 6 is a schematic diagram illustrating a method for detecting a combination of such colors, from among combinations of unique colors included in the image data. This processing is performed in step S502 by the CPU 102 based on the list of unique colors detected in step S501 (or step S301). Among combinations of unique colors included in the image data, a combination of colors that have degenerated and require color degeneracy correction is detected. The values of detected colors are stored.

A color gamut 601 in FIG. 6 is a color gamut of input image data. A color gamut 602 is a color gamut after gamut mapping in step S302. There are a color 603 and a color 604 included in the input image data. A color 605 is a color obtained by performing gamut mapping on the color 603. A color 606 is a color obtained by performing gamut mapping on the color 604. When a color difference 608 between the color 605 and the color 606 is smaller than a color difference 607 between the color 603 and the color 604, it is determined that color degeneracy has occurred. In addition, when the color difference 608 is unperceivable, it is determined that there is a need to perform correction. A color difference being unperceivable means that a saturation difference is also unperceivable. When a pair of colors that have degenerated and require correction is detected, the pair of colors is stored. Determination processing is repeated for the number of combinations of two colors in the unique color list. Note that, in order to reduce the calculation amount, the grid points of the input color space may be made sparse as a first method, or a range of combinations of colors may be limited as a second method. The second method will be described later in relation to description given with reference to FIG. 6. Note that, in this figure, the color information is color information in the JCh color space, but the color space that is used here may also be another color space that can define a space distance.

In the present embodiment, a Euclidean distance in the JCh color space is used as a color difference, for example. The distance between coordinate values in the color space indicates a difference in color. This distance being short indicates that the coordinate values are close and the colors are approximate. As a result, it is difficult to identify the two colors from each other. The JCh color space is expressed in cylindrical coordinates. For this reason, each piece of color information is composed of a height denoted by J, a distance from the central axis denoted by C, and an azimuth angle denoted by h. The color 603 is represented as J603, C603, and h603. The color 604 is represented as J604, C604, and h604. The color 605 is represented with J605, C605, and h605 serving as components thereof. The color 606 is represented as J606, C606, and h606. In the JCh color space, calculation formulas for a difference in color ΔE607 and a difference in color ΔE608 are given below.

[Formula 1]

$$\Delta E_{607} = \sqrt{(J_{603} - J_{604})^2 + (C_{603} - C_{604})^2 + ((C_{603} - C_{604})\sin(h_{603} - h_{604}))^2} \quad \text{(Expression 4)}$$

$$\Delta E_{608} = \sqrt{(J_{605} - J_{606})^2 + (C_{605} - C_{606})^2 + ((C_{605} - C_{606})\sin(h_{605} - h_{606}))^2} \quad \text{(Expression 5)}$$

Expressions 4 and 5 are exemplary, but if a difference for each component in the expressions is used as a difference for each components between two colors of interest, it is possible to obtain the distance between any two colors, that is to say a color difference in the JCh color space.

If the difference in color ΔE608 is smaller than the difference in color ΔE607, and the difference in color ΔE608 is not large enough to identify the difference in color, it is determined that color degeneracy has occurred and there is a need for correction. On the contrary, if the difference in color ΔE608 between the color 605 and the color 606 is large enough to identify these different colors based on the human visual feature, it can be determined that there is no need to correct the difference in color. A threshold may be set for the difference between the color difference 608 and the color difference 607, which serves as a reference for determining whether or not a difference in color is identifiable, in accordance with an expected degree of identification.

Note that determination does not need to be performed, for all of the colors included in image data, as to whether or not degeneracy occurred between two colors and there is a need for correction. Two input colors between which the difference in color ΔE607 is too small for an observer to perceive do not need to be set as a correction target even when degeneracy occurs, for example. In addition, two colors between which the difference in color is clearly estimated to be perceivable even after gamut mapping do not need to be set as a correction target, even if color degeneracy occurs. This estimation may be realized, for example, by performing transformation using a gamut mapping table in advance, and determining, based on the result, a color difference that is perceivable after transformation. One input color included in document data is set as a first color of interest, for example. In addition, a color whose distance from the first color of interest is larger than a first reference value indicating whether or not the color difference is perceivable, and whose color difference from the first color of interest when gamut mapping is performed is smaller than or equal to a second reference value indicating whether or not the color difference is perceivable is selected as a second color of interest. Then, regarding a pair of the first color of interest and the second color of interest, determination may be performed as to whether or not color degeneracy has occurred and there is a need to perform correction. Here, in a uniform color space, a region of colors that are perceived as being the same is considered to be substantially the same in any region of the color space (in other words, any color). For this reason, the above first reference value and second reference value may each be the same value in any region of the input color space, or may be determined in advance. Note that, for all the colors included in the image data, determination may be performed on degeneracy between two colors and a need for correction.

In step S503, the CPU 102 determines in step S502 whether or not there is a combination of colors that have degenerated and need to be corrected. If there is no combination of colors that degenerated and need to be corrected, the procedure advances to step S504, and it is determined that the image does not require color degeneracy correction, and the processing ends. In step S504, particularly no processing needs to be performed. On the other hand, if there is at least one combination of colors that have degenerated, the procedure advances to step S505, and correction is performed.

Color degeneracy correction causes a change in color. For this reason, a combination of colors that have not degenerated also undergoes color change due to color degeneracy correction, which is an unnecessary color change. For this reason, determination may be performed as to whether or not there is a need for color degeneracy correction, based on the total number of combinations of unique colors and the number of combinations that have degenerated. Specifically, when the number of combinations of colors determined as having degenerated and requiring correction is larger than half the total number of combinations of unique colors, it may be determined that there is a need for color degeneracy correction. By performing the above processing, it is possible to suppress harmful effects of a color change caused by color degeneracy correction.

Next, color degeneracy correction that is executed in step S505 will be described. In step S505, the CPU 102 performs color degeneracy correction based on the input image data, the image data subjected to gamut mapping, and the gamut mapping table. At least one color out of a pair of colors determined in step S502 as requiring correction is set as a target.

As described above, FIG. 6 indicates that color degeneracy has occurred in a combination of the color 603 and the color 604 as a result of gamut mapping. In view of this, color degeneracy can be corrected by separating the color 605 and the color 606 after transformation, that is to say increasing the distance between the colors, in a predetermined color space. Specifically, correction processing for increasing the distance between two colors after gamut mapping to at least a distance at which the colors can be identified as different colors based on the human visual feature is performed. Processing for correcting color degeneracy according to the present embodiment is processing in which a color component for which a change amount is the largest, among color components is saturation. Processing for correcting color degeneracy is repeated for the number of combinations of colors that are targeted for color degeneracy correction. The result of color degeneracy correction performed for the number of combinations of colors is held in a table, with color information before correction and color information after correction being associated with each other.

Next, specific processing for correcting color degeneracy will be described. A color difference correction amount 609 for increasing a difference in color ΔE is obtained from the difference in color ΔE608. In terms of visual feature, the difference between the difference in color ΔE607 and the difference in color ΔE608 is the color difference correction amount 609. Here, assume that the difference in color ΔE608 between the color 606 and the color 605 is too small to perceive. In view of this, the color 605 is corrected by the color difference correction amount 609, which is a perceivable amount as a difference in saturation. A color 610 is a result of the correction. After correction processing, the difference between the saturation of the color 605 and the saturation of the color 606 is a saturation difference 612, and the difference between the saturation of the color 606 and the saturation of the color 610 is a saturation difference 611. The difference in color ΔE608 is too small to perceive, and thus the saturation difference 611 is also too small to perceive. In addition, the saturation difference 612 is larger than the saturation difference 611, and the difference between the color 606 and the color 610 is large enough to perceive.

The color difference correction amount 609 can be changed through setting. The color 610 is defined as a new mapping destination, which is indicated by coordinate values in the JCh space, based on the color difference correction amount 609 defined here. At this time, defining the color 610 such that a change in hue in the CIECAM color space is smaller than a change in saturation is more effective. For this reason, for example, color correction may be performed from the color 606 toward the J axis in the JCh color space. Correcting toward the J axis is adjusting a J component (luminance) and/or a C component (saturation) without changing the value of an h component (hue). Alternatively, only the C component (saturation) may be adjusted. In this manner, correction can be performed without changing the hue. In this case, the difference between the difference in color ΔE607 and the difference in color ΔE608 is not necessarily the color difference correction amount 609. When a color targeted for correction is the color 606, the saturation component C of the color 605 may be corrected such that the distance between the color 610 obtained by correcting the color 605 and the color 606 exceeds a reference value of distance that is large enough to perceive the saturation difference. It should be noted that, at this time, the luminance component J may also change due to a calculation error or the like. In this case, intended effects can be achieved by performing correction such that C changes most among J, C, and h that are the three components of a color in this coordinate system. This distance can be obtained in the same manner as with Expression 4 or 5.

Note that a correction target is specified using a color difference between two colors as a reference, and thus one of or both two colors may be a correction target. When only the saturation component is corrected toward the J axis, for example, changing a less saturated color decreases the absolute value of a value that is adjusted. In view of this, the less saturated color may be determined as a correction target, and a correction amount may be determined for the color. In addition, by decreasing the saturation of the less saturated color and increasing the saturation of the more saturated color, it is possible to decrease the correction values for the respective colors. It should be noted that this is limited to a case where a color representation range is not exceeded if saturation is increased. Here, a case will be described in which only saturation components are corrected. Correcting saturation means correcting only saturation while brightness and hue are allowed within a range of calculation error. Performing this operation in a cylindrical coordinate system is correcting only C that is radial components without changing J and h. An example will be described in which only the saturation of the color 605 is corrected in a direction in which a difference in saturation from the color 606 increases. In this case, searching for a less saturated color than the color 605 to a degree where the saturation difference from the color 606 is perceivable, without changing J components and h components wherever possible, is saturation correction. This is searching for a color for which C is smaller than that of the color 605, from coordinate values J, C, and h that the color 605 has, without changing J and h.

Note that FIG. 6 shows an example of colors on one hue plane, but also regarding colors included in different hue planes, it is possible to detect and correct color degeneracy in a similar manner to that described above. In that case, regarding one of or both the colors that are correction targets, correction for changing saturation components may be performed so as to increase a saturation difference without changing the hues of the two colors before correction whenever possible. Due to this correction, the two colors that have a perceivable color difference in a color reproduction area of an input apparatus are transformed into two colors that have a perceivable color difference also in a color reproduction area of an output apparatus.

Furthermore, the present invention is effective when a color reproduction area of an input apparatus and a color reproduction area of an output apparatus are different from each other significantly. In particular, the present invention is effective when an output color reproduction area is smaller than or equal to about 50% of an input color reproduction area.

In step S506, the CPU 102 changes the JCh color transformation information using the result of color degeneracy correction in step S505. In other words, the JCh color transformation information is updated using a determined color that is a correction target and a correction value, and corrected JCh color transformation information is created. Specifically, a color value specified using, as an index, the color specified as a correction target may be overwritten by a value after correction. The JCh color transformation information before change is a table for transforming the color 603 that is an input color into the color 605 that is an output color. Based on the result in step S505, the JCh color transformation information is changed to corrected JCh color transformation information in which the color 603 that is an input color is transformed into the color 610 that is an output color. If a JCh value that is input to this corrected JCh color transformation information is replaced with RGB value set as a transformation target in the processing 402, a corrected gamut mapping table is obtained.

In this manner, a corrected gamut mapping table can be created. Changing the gamut mapping table is repeated for the number of combinations of colors that are correction targets.

In step S507, the CPU 102 transforms values of the corrected gamut mapping table obtained as a result of step S506 into color values of the RGB color space. Accordingly, a table (color correction table) for transformation from RGB into RGB is obtained. The color correction table that is ultimately obtained here is a table for transforming image data in an input color space, namely sRGB into a device color space of a printer, such as the RGB color space.

As described above, if the above processing is performed by applying the gamut mapping table after color degeneracy correction to an input image, with respect to a combination of unique colors included in the input image, it is possible to increase the distances between colors, for a combination of colors that degenerate. As a result, color degeneracy can be reduced with respect to the combination of colors that degenerate. This is because, if the input image data is sRGB data, a gamut mapping table is creased based on assumption that the input image data includes 16,777,216 colors. The gamut mapping table created based on this assumption is created in consideration of color degeneracy and saturation of even colors that are not included in the input image data. In the present embodiment, by detecting colors included in the input image data, it is possible to correct the gamut mapping table adaptively to the input image data. Also, it is possible to create a gamut mapping table limited to the colors included in the input image data. As a result, it is possible to perform suitable adaptive gamut mapping on the input image data, and thus color degeneracy can be reduced.

In the present embodiment, processing when input image data has a single page has been described. Input image data may have a plurality of pages. If the input image data has a plurality of pages, the processing flow in FIG. 3 may be performed on all of the pages. Furthermore, the processing in FIG. 3 may be performed for each page. As described above, also when input image data has a plurality of pages, it is possible to reduce the degree of color degeneracy due to gamut mapping.

In the present embodiment, the gamut mapping table after color degeneracy correction is applied to input image, but a correction table for performing color degeneracy correction on image data after gamut mapping may be created. In that case, a correction table for transformation from color information before correction into color information after correction may be generated based on the color degeneracy correction result in step S505. The generated correction table after gamut mapping is the table for transformation from the color 605 into the color 610 in FIG. 4. In step S305, a correction table generated for image data after gamut mapping is applied. As described above, by correcting image data after gamut mapping, it is possible to reduce the degree of color degeneracy due to gamut mapping.

Figure 7:
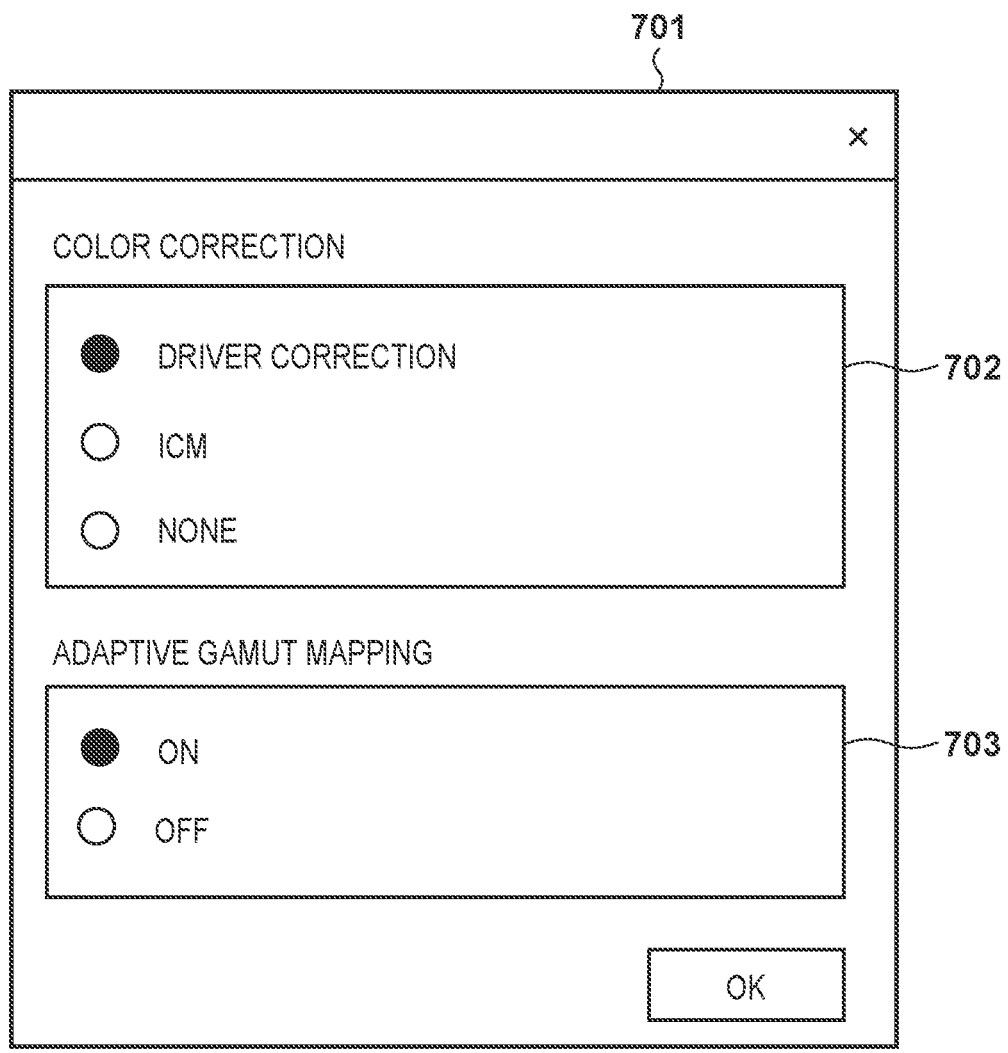
FIG. 7 is a diagram showing user input UI.

In the present embodiment, data indicating whether or not to execute this processing may be input by the user. In that case, a user interface (UI) screen such as that shown in FIG. 7 is displayed on a display mounted in an image processing apparatus or a recording apparatus, so as to cause the user to perform input. The UI in FIG. 7 includes a color correction select field 702 and an adaptive gamut mapping select field 703. In FIG. 7, in a select field 701, the user can select a type of color correction using a toggle button. Furthermore, in the select field 702, the user can select whether or not to execute adaptive gamut mapping, namely ON or OFF of this processing, using a toggle button. These selection results are stored in a storage medium as parameters, and are referenced before color correction is performed. A color correction parameter set in the color correction select field 701 is referenced immediately before processing in FIG. 5, and branching of processing is determined in accordance with the value, for example. If "None" is selected, for example, the procedure branches to step S504. On the other hand, if "driver correction" is selected, the procedure branches to step S501.

In addition, for example, an adaptive gamut mapping parameter set in the adaptive gamut mapping select field 703 is referenced immediately after step S505 in FIG. 5, and branching of processing is determined in accordance with the value. If "ON" is selected, for example, the procedure branches to step S506. On the other hand, if "OFF" is selected, the procedure branches to step S507.

By performing the above processing, it is possible to switch as to whether or not to execute adaptive gamut mapping in accordance with an instruction from the user. As a result, when the user desires to reduce the degree of color degeneracy, adaptive gamut mapping can be executed.

In addition, in the above embodiment, in order to correct color degeneracy, a table for JCh color transformation information is created. However, if JCh values of colors included in document data are associated with JCh values measured from a printed image, the table for JCh color transformation information does not particularly need to be created.

According to the first embodiment described above, when mapping a digital document into a small color reproduction area, if there is a degenerated color in a region in which a hue can be perceived as different hue, the distance between colors for which color degeneracy occurs is increased using a hue that is perceived as the same hue. Accordingly, even if color space compression for reducing the color reproduction area is performed, an image in which colors can be identified without giving a feeling that something is amiss, and a high-quality printed article can be provided using the image.

Second Embodiment

Figure 8:
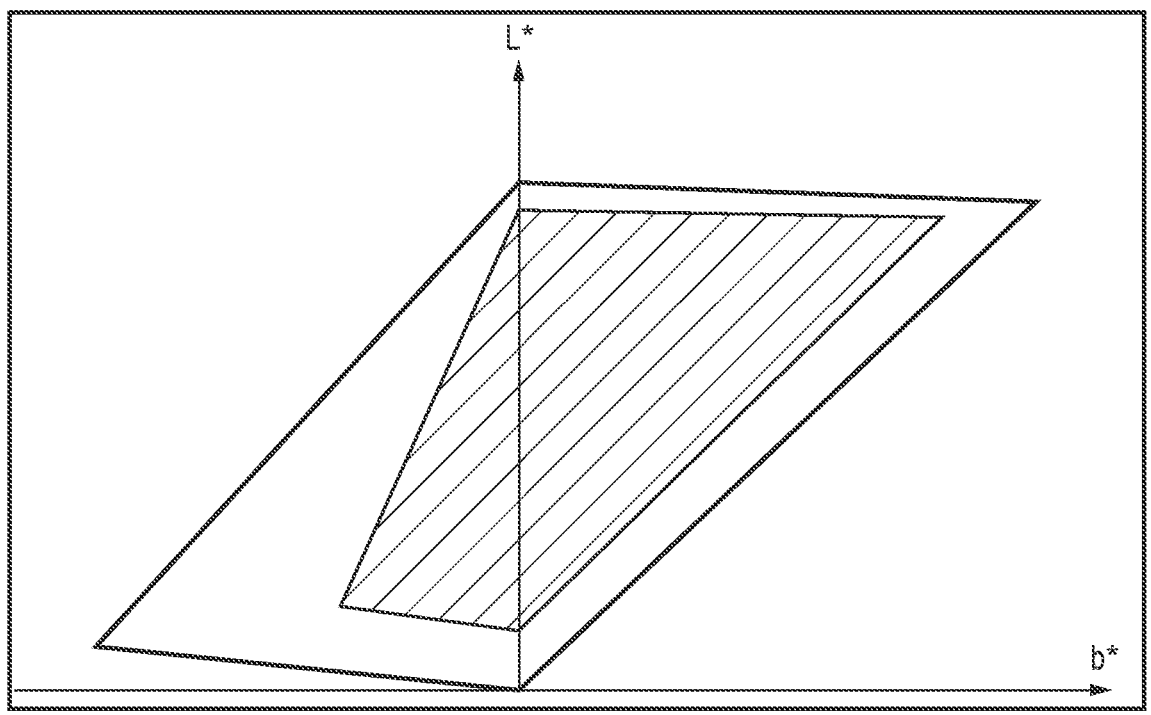
FIG. 8 is a schematic diagram showing a cross-sectional view of sRGB and a color reproduction area of a recording apparatus, on a b*L* plane in a CIEL*a*b* space.

The first embodiment described so far is directed to a general-purpose means that is independent of hue. A more effective applying method will be described below. FIG. 8 is a schematic diagram showing a cross-sectional view of sRGB and a color reproduction range of a common printer, on the b*L* plane in the CIEL*a*b* space. The positive direction of the b* axis indicates yellow, and the negative direction indicates blue color. In a subtractive color mixing printer, yellow is a primary color of ink. Commonly, yellow ink is often bright ink. For this reason, even if ink is discharged to the allowable maximum, L* does not change very much. On the other hand, blue color is a secondary color obtained by blending cyan and magenta. Cyan ink and magenta ink are often thick. For this reason, there are cases where a difference in brightness between blue and black is unlikely to be exhibited at the maximum density point of the printer. The color reproduction range of the printer has a location (or region) where a brightness difference is unlikely to be exhibited depending on an ink characteristics. In view of this, by determining whether or not the hue of a color that is to a processing target has a sufficient brightness difference, it is possible to effectively apply the present embodiment to the processing.

Figure 9:
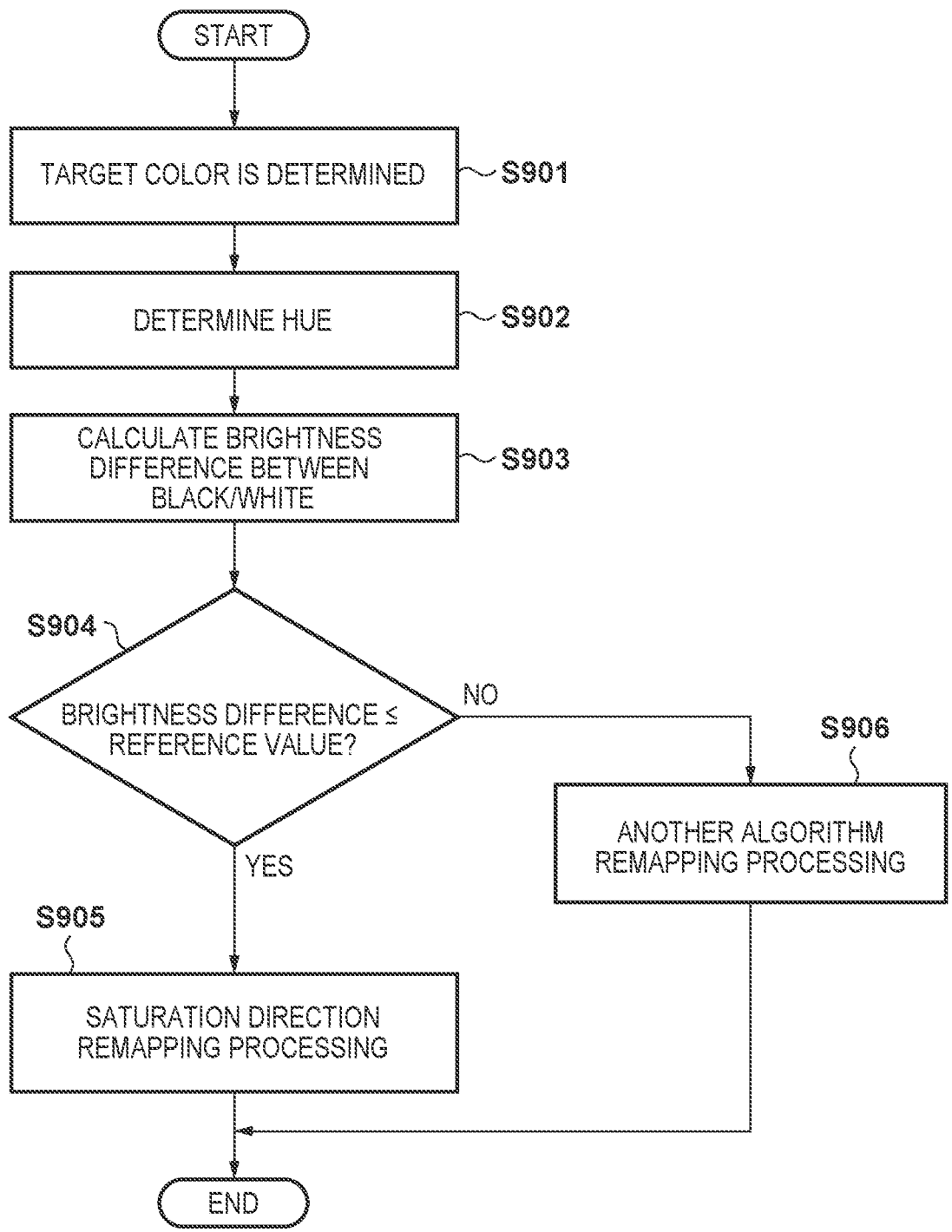
FIG. 9 is a flowchart of adaptive gamut mapping after brightness difference determination.

FIG. 9 is a flowchart showing an operation when adaptive gamut mapping is performed after a brightness difference is determined for each hue. Note that a signal in FIG. 9 is a value in the JCh space used in the first embodiment. In step S901, first, a color that is a processing target is determined. In step S902, the value of the hue of the color may be checked. In step S903, the maximum saturation point of a printer at which the hue is the same as the above hue is determined. A specific method will be described.

Figure 10:
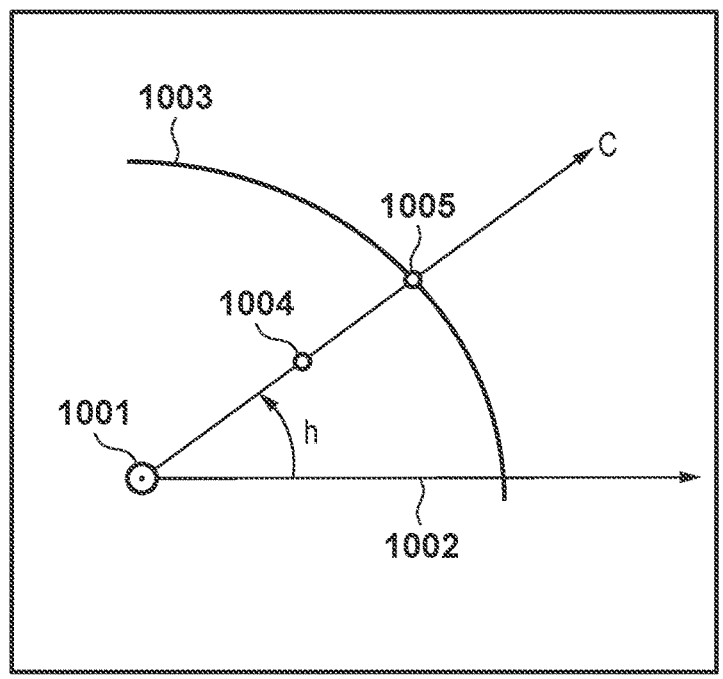
FIG. 10 is a schematic diagram showing projection of a color of interest and a color reproduction area of a printer onto a saturation plane in a JCh space.

FIG. 10 is a schematic diagram showing projection of a color of interest and a color reproduction area of a printer, onto a saturation plane in the JCh space. A reference point 1001 is on the J axis. The J axis is orthogonal to the plane of FIG. 10. A reference line 1002 is a reference line for an azimuth angle, namely the hue h. A color reproduction area 1003 is a color reproduction area of a printer. A region on the J axis side relative to the color reproduction area 1003 indicates the color reproduction area of the printer. A color of interest 1004 is a color that is to a processing target, and has been determined in step S901. The maximum color 1005 is a color obtained by extending the color of interest 1004 to the maximum point of the color reproduction area 1003 while maintaining h (hue) of the color of interest 1004. How to find the maximum color 1005 is as follows: the closest value of h may be found from a ring formed by maximum saturation points in the color reproduction area 1003 expressed in JCh. Next, the J value (luminance) of the maximum color 1005 selected in this manner is in focus. The absolute values of the differences between the J value of the maximum color 1005 and white (maximum luminance value) and black (minimum luminance value) are used. The difference between the J value and white is denoted by ΔW. In addition, the difference between J value and black is denoted by ΔK.

In step S904, determination is performed as to whether or not ΔW or ΔK is smaller than or equal to a predetermined threshold. If ΔW or ΔK is smaller than or equal to the predetermined threshold, the procedure advances to step S905. Here, the predetermined threshold is preferably smaller than or equal to about 25 when the J value is represented in 8 bits, for example. Step S905 is processing described with reference to FIG. 5 in the first embodiment.

It should be noted that, here, one of the colors that are processing targets in FIG. 5 is set as the target color determined in step S901, another color is selected as the other of the colors that are processing targets, and the processing in FIG. 5 is executed. That is to say, in the present embodiment, out of the colors that are processing targets in the first embodiment, a color whose difference in luminance from black or white is smaller than or equal to a predetermined reference value is set as a target, a need for correction is determined, correction is performed if necessary, and a corrected gamut mapping table is reconfigured. On the other hand, if it is determined in step S904 that both ΔW and ΔK is larger than the predetermined threshold, the procedure advances to step S906. In this case, another algorithm that enables two colors to be recognized as different colors without making a saturation difference may be applied.

According to the present embodiment, a gamut mapping table is corrected using, as a target, a color that is corrected more effectively. For this reason, compared with the first embodiment, a processing amount can be reduced without losing the effect of correction.

OTHER EMBODIMENTS

Note that the recording apparatus according to the embodiments is a serial inkjet recording apparatus that scans a recording medium using a recording head mounted in a carriage, and forms an image while conveying the recording medium. In the present embodiment, instead, a line recording apparatus that includes a fixed line head corresponding to the width of a recording medium, and forms an image while conveying the recording medium may also be used. In addition, a recording apparatus that adopts an electrophotographic method, and a recording apparatus that adopts another method may be used in place of an inkjet recording apparatus.

In addition, the recording apparatus according to the present embodiment uses a sheet (cut sheet) for each page as a recording medium, but a may be configured to form an image onto a rolled sheet, and then cut the sheet.

In addition, color correction in step S303 may be performed such that the difference in saturation between a color value of document data and a colorimetric value corresponding to the color value is larger after correction than the difference before correction.

In addition, color correction in step S303 may be performed such that the difference between hue components of a color value before and after correction is smaller than the difference between saturation components.

In addition, color correction in step S303 may be correction of transformation information for transforming the colorimetric value into a color value in a uniform color space after correction.

In addition, color correction in step S303 may be reflected on transformation information for transformation from a color space of document data such as the RGB color space into a color space of a recording apparatus such as the RGB color space. Furthermore, a gamut volume in the color space of the recording apparatus that is transformed using this transformation information may be smaller than or equal to half a gamut volume in the color space of the document data.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-147209, filed Sep. 15, 2022, and Japanese Patent Application No. 2023-114597, filed Jul. 12, 2023, which are hereby incorporated by reference herein in their entirety.

What is claimed is:

1. An image processing apparatus comprising:
at least one memory that stores at least one program; and
at least one processor, the at least one program causing the
at least one processor to:
obtain image data that is defined as a first color gamut,
execute transformation processing for transforming the image data into image data that is defined as a second color gamut that is different from the first color gamut, using color transformation information, and
when, as a result of transformation processing that uses first color transformation information, a first pair of color values included in the image data is transformed into a second pair of color values that have a color difference that is not perceived as different colors, generate second color transformation information such that the first pair of color values is transformed into a third pair of color values that have a color difference that is perceived as different colors as a result of performing transformation processing that uses the second color transformation information,
wherein a saturation difference of the third pair of color values is larger than a saturation difference of the second pair of color values.

2. The image processing apparatus according to claim 1, wherein the at least one program further causes the at least one processor to:
associate information obtained by transforming first color information that includes color values included in the image data into a uniform color space, with information obtained by transforming, into the uniform color space, second color information that includes colorimetric values obtained by performing colorimetry on a recording medium on which an image has been formed by an image forming apparatus based on the image data.

3. The image processing apparatus according to claim 2, wherein, in the generation, a pair of color values that has a color difference that is not perceived as different colors is detected based on the associated information.

4. The image processing apparatus according to claim 3, wherein, in the generation, the third color transformation information is generated by regarding each detected pair of color values as the second pair of color values, and obtaining the third pair of color values for the second pair of color values.

5. The image processing apparatus according to claim 3, wherein, in the generation, among the detected pairs of color values, a color value whose distance from a color value of a minimum luminance value or a maximum luminance value is shorter than or equal to a predetermined reference value in the uniform color space is targeted for correction.

6. The image processing apparatus according to claim 2, wherein, in the generation, in the uniform color space, color values between which a distance is shorter than or equal to a predetermined reference value are set as a pair of color values that are not perceived as different colors, and color values between which a distance is longer than the reference value are set as a pair of color values that are perceived as different colors.

7. The image processing apparatus according to claim 2, wherein, in the generation, among pairs of color values in the uniform color space that correspond to the first color information, colors between which a distance is longer than a reference value are targeted for correction.

8. The image processing apparatus according to claim 2, wherein, in the generation, among pairs of color values in the uniform color space that correspond to the second color information, colors between which a distance is shorter than or equal to a second reference value are targeted for correction.

9. The image processing apparatus according to claim 2, wherein the uniform color space is a CIE color appearance model (CIECAM) color space.

10. The image processing apparatus according to claim 9, wherein the uniform color space is a CIE-JCh color space.

11. The image processing apparatus according to claim 1, wherein, in the generation, at least one of color values of the second pair is set as a color targeted for correction, and a color obtained by correcting the color targeted for correction so as to increase a saturation difference on a constant hue plane is set in third pair of color values.

12. The image processing apparatus according to claim 1, wherein one color value of the second pair is set as a color targeted for correction, and a saturation component of the color targeted for correction is determined by changing the saturation component so as to increase a difference from a saturation component of the other color value.

13. The image processing apparatus according to claim 1, wherein the transformation processing includes transformation processing for transforming the image data using the first color transformation information,
in the generation, the second color transformation information is generated based on a result of the transformation processing that uses the first color transformation information, and
the transformation processing includes transformation processing for transforming the image data using the generated second color transformation information.

14. A non-transitory computer-readable medium storing at least one program for causing, when executed by a computer, the computer to:
obtain image data that is defined as a first color gamut,
execute transformation processing for transforming the image data into image data that is defined as a second color gamut that is different from the first color gamut, using color transformation information, and
when, as a result of transformation processing that uses first color transformation information, a first pair of color values included in the image data is transformed into a second pair of color values that have a color difference that is not perceived as different colors, generate second color transformation information such that the first pair of color values is transformed into a third pair of color values that have a color difference that is perceived as different colors as a result of performing transformation processing that uses the second color transformation information,
wherein a saturation difference of the third pair of color values is larger than a saturation difference of the second pair of color values.

15. An image processing method that is executed by an image processing apparatus, the method comprising:
obtaining image data that is defined as a first color gamut;
executing transformation processing for transforming the image data into image data that is defined as a second color gamut that is different from the first color gamut, using color transformation information; and
when, as a result of transformation processing that uses first color transformation information, a first pair of color values included in the image data is transformed into a second pair of color values that have a color difference that is not perceived as different colors, generating second color transformation information such that the first pair of color values is transformed into a third pair of color values that have a color difference that is perceived as different colors as a result of performing transformation processing that uses the second color transformation information,
wherein a saturation difference of the third pair of color values is larger than a saturation difference of the second pair of color values.

* * * * *